March 13, 1945. N. A. HENDRY 2,371,327

METHOD AND APPARATUS FOR REPAIRING RADIO TUBES, LAMPS, AND THE LIKE

Filed Dec. 27, 1943

INVENTOR.
NORMAN A. HENDRY
BY Earl Chappell
ATTORNEYS

UNITED STATES PATENT OFFICE 2,371,327

METHOD AND APPARATUS FOR REPAIRING RADIO TUBES, LAMPS, AND THE LIKE

Norman A. Hendry, Portland, Mich.

Application December 27, 1943, Serial No. 515,861

5 Claims. (Cl. 316—28)

This invention relates to improvements in method and apparatus for repairing radio tubes, lamps, and the like.

The objects of this invention are:

First, to provide an apparatus for repairing radio tubes or the like which is simple in construction, yet highly efficient in operation.

Second, to provide an apparatus for repairing radio tubes which welds the broken filaments of the radio tubes without impairing the vacuum in the tube.

Third, to provide an apparatus which can be operated to repair any type of radio tube and regardless of the current consumption.

Fourth, to provide an apparatus which provides the necessary amount of current for properly welding the filament without any danger of burning it out.

Fifth, to provide an apparatus which is automatic in operation and enables the work to be done by an inexperienced operator.

The principal feature of this invention is to repair by welding the broken filaments of radio tubes, either transmitting or receiving, incandescent lamp bulbs and other wires contained in a vacuum or gas filled chamber without opening the chamber. This operation of welding is accomplished by utilizing the electrical energy stored in a charged condenser which, when short circuited, will produce an electrical arc or flash between the ends of the broken filament, thereby instantaneously welding the filament. The voltage necessary to cause this arc is many times greater than the rated capacity of the tube. Should this high voltage remain in the welding current any length of time, it would cause the filament either to crystallize and break or it would cause the filament to become molten and cease to weld itself together or to "burn out." The voltage is controlled by the double throw switch and when connected to the D. C. power terminals the current saturates or charges the condenser until the tube is placed in the socket and the switch connecting the terminals of the socket with the condenser are closed. This allows the condenser to discharge the stored electrostatic energy, thereby causing the ends of the filaments to weld themselves together. If the filaments do not flash the tube can be vibrated slightly until the ends are in position to spot weld.

At the instant of the transfer of energy to the tube to produce the weld, the condenser is discharged completely and since there is no activating voltage present to recharge the condenser the flow of current ceases. By this method of transfer or controlling of current the filament cannot be burned out by the high voltage necessary to produce the arc that welds the filament.

Referring to the accompanying drawing which forms part of this specification—

The embodiment of my invention illustrated in the accompanying drawing comprises a case 1 having a panel 2 which may be a top or side or front panel according to the structure of the case and the positioning of the case, or the panel may be designed for mounting on a wall or other suitable support.

The panel is provided with a plurality of sockets 3 adapted to receive the tubes or lamps to be repaired and it will be noted that these are of different designs so far as the terminal contact features are concerned, this however being conventionally illustrated.

Figure 1:
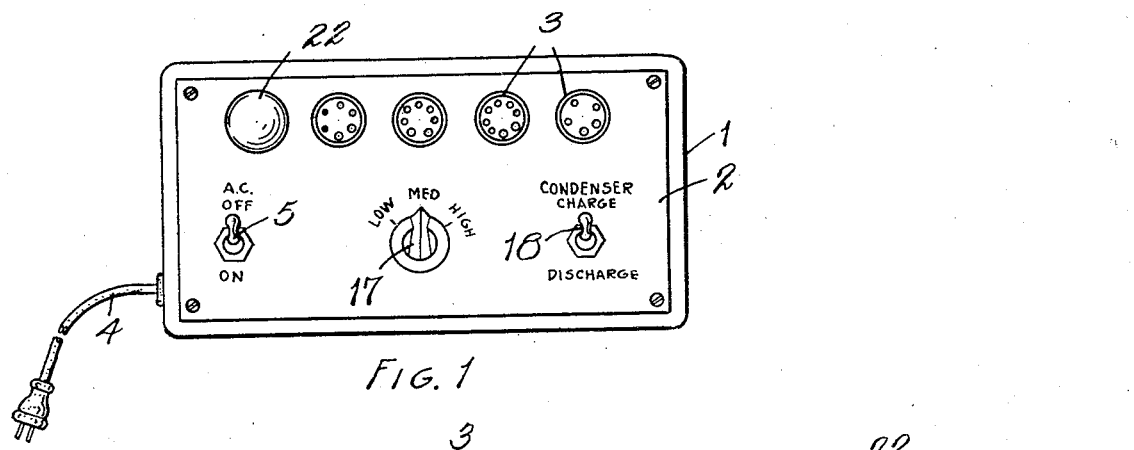
Fig. 1 is a top plan view of an apparatus embodying my invention.
Figure 2:
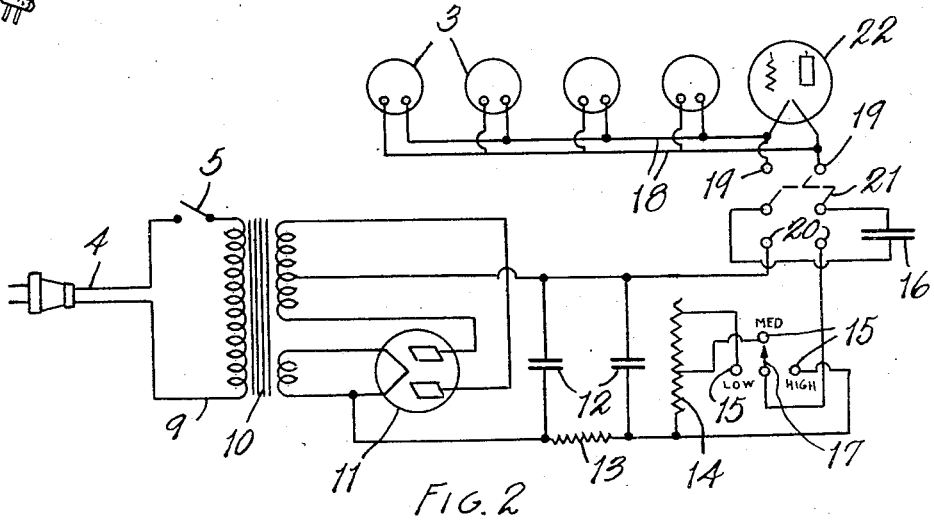
Fig. 2 is a wiring diagram thereof.

Referring to the wiring diagram of Fig. 2, 4 designates a source of A. C. current supply which is controlled by the switch 5 of the power pack designated generally by the numeral 9. This is, or may be, of standard construction comprising a transformer 10, rectifier tube 11, suitable condensers 12 and resistance 13. At the rear of the power pack, I provide a variable resistance 14 having taps 15 therefrom which may be connected to the condenser 16 by the switch 17. These taps are designated low, medium and high. This provides means for variably charging the condenser 16.

The electrical connections for the sockets designated 18 are provided with terminal or switch contacts 19 while the charging circuit for the condenser is provided with contacts 20.

The double throw switch 21 is adapted to be adjusted to connect the switch contacts 20 with the condenser for charging the condenser or to connect the condenser with the socket circuit contacts 19 for unloading the condenser or delivering the charge of the condenser to a tube or lamp 22 disposed in one of the sockets.

With this arrangement, only the charge of the condenser is delivered to the tube or lamp to be repaired and this is sufficient to spot weld the broken ends together, at the same time the tube or lamp is guarded against an excessive current which might burn out or destroy the filament. The size or value of the condenser is not critical except that it should have a capacity exceeding the minimum for the particular assembly.

My apparatus may be used by relatively inexperienced persons as it is frequently impossible for them to so manipulate it other than it is intended, by which manipulation the welding current is supplied but, as stated, it is not possible to destroy the work through an excessive current. The adjustment of the charging current for low, medium and high is provided although even when a higher charge is delivered to a particular tube than is necessary it is not likely to destroy the tube.

I have found that satisfactory work can be done when the power supply taps are adjusted as follows: For tubes (or lamps) whose filaments are designed for a current consumption of .05 amp. or less, 50 volts should be available at the selected tap. For tubes designed for a current consumption of .06 to .10 amp., 100 volts should be available; for filaments of tubes designed for .10 to .25 amp. operation, 200 volts; and for tubes requiring from .25 to .30 amp. 300 volts, and increased voltage accordingly for filaments designed for higher current consumption. It will be appreciated that the apparatus can be made very flexible to cover any specified range of voltages desired by supplying the correct resistances and switch contacts. For simplicity in illustration, I have illustrated an apparatus using three steps of available voltage. Similarly, any desired number of sockets can be installed on the panel to cover the various types of tubes in general use.

I have illustrated and described my invention in a somewhat conventionalized form but illustrating a structure which has been found highly satisfactory. I have not attempted to illustrate or describe various modifications and adaptations as it is believed that this disclosure will enable those skilled in the art to embody or adapt my improvements as may be desired.

Having thus described my invention, what I claim as new and desire to secure by Letters Patent is:

1. An apparatus for repairing broken filaments of radio tubes, incandescent lamps, and the like, comprising a socket for receiving the work to be repaired and having electrical circuit connections, a source of D. C. current supply, a condenser, a variable resistance interposed in said source of current supply in advance of said condenser, a condenser charge regulating switch associated with said variable resistance in advance of said condenser, and a double throw switch selectively adjustable to a first position and to a second position, said first position of the switch connecting said condenser to said source of current supply at the rear of said charge regulating switch whereby to charge said condenser, said second position of the switch disconnecting the condenser from said current supply and connecting the condenser to said socket connections whereby to discharge the charged condenser through the broken filament.

2. An apparatus for repairing broken filaments of radio tubes, incandescent lamps, and the like, comprising a socket for receiving the work to be repaired and having electrical circuit connections, a source of D. C. current supply, a condenser, a variable resistance interposed in said source of current supply in advance of said condenser, and a double throw switch selectively adjustable to a first position and to a second position, said first position of the switch connecting said condenser in said source of current supply at the rear of said variable resistance whereby to charge said condenser, said second position of the switch disconnecting the condenser from said current supply and connecting the condenser to said socket connections whereby to discharge the charged condenser through the broken filament.

3. An apparatus for repairing radio tubes and the like comprising a source of D. C. current, a condenser, a support for the tube or the like to be repaired provided with electrical connections, and a double throw switch adjustable to a first position and to a second position, said first position of the switch connecting said condenser to said current supply to charge said condenser, said second position of the switch disconnecting the condenser from said current supply and connecting the condenser to the electrical connections to the tube whereby to discharge the condenser through the tube.

4. An apparatus for welding broken filaments of radio tubes, incandescent lamps, and the like comprising a source of D. C. current supply, a condenser, means for connecting said current supply to said condenser for charging the same and for thereafter disconnecting the condenser from the current supply and for connecting said condenser to the tube or lamp to be repaired whereby only the charge of the condenser is delivered thereto.

5. An apparatus of the class described, comprising a condenser, means for variably charging said condenser, a support for the tube or lamp to be repaired, and a switch adjustable to one position to connect said condenser to a source of supply for charging the condenser and adjustable to another position to disconnect the condenser from the current supply and to connect the condenser with the tube or lamp to be repaired whereby only the charge of the condenser is delivered to the lamp or tube.

NORMAN A. HENDRY.